United States Patent [19]

Lange

[11] 4,110,770
[45] Aug. 29, 1978

[54] SYSTEM FOR MOUNTING ACCESSORIES ON A CAMERA

[75] Inventor: Karl-Heinz Lange, Bunde, Fed. Rep. of Germany

[73] Assignee: Balda-Werke Photographische Gerate und Kunststoff GmbH & Co. KG, Fed. Rep. of Germany

[21] Appl. No.: 738,444

[22] Filed: Nov. 3, 1976

[30] Foreign Application Priority Data

Aug. 6, 1976 [DE] Fed. Rep. of Germany ....... 2635370

[51] Int. Cl.² ............................................. G03B 17/00
[52] U.S. Cl. .................................... 354/202; 354/126; 354/288; 354/295
[58] Field of Search ............... 354/126, 145, 202, 288, 354/295

[56] References Cited

U.S. PATENT DOCUMENTS

| 3,213,774 | 10/1965 | Curtiss | 354/126 |
| 3,883,884 | 5/1975 | Fuchsel | 354/202 X |
| 3,943,537 | 3/1976 | Lange | 354/288 |
| 3,974,513 | 8/1976 | Waaske | 354/295 |

FOREIGN PATENT DOCUMENTS

| 1,211,480 | 2/1966 | Fed. Rep. of Germany | 354/202 |
| 1,042,977 | 9/1966 | United Kingdom | 354/288 |

Primary Examiner—John Gonzales
Attorney, Agent, or Firm—Jacobs & Jacobs

[57] ABSTRACT

A system for mounting an accessory unit, such as a flash unit, on a camera housing comprises at least one fixed hook-shaped bolt and at least one movable hook-shaped bolt on the accessory unit with corresponding apertures in the camera housing for receiving the bolts, the inner surface of the camera housing being provided with inclined surfaces leading away from the apertures, the hook-shaped bolts being provided with corresponding inclined surfaces and the inclined surface of the movable hook-shaped bolt being substantially parallel to the contact plane, the locking action being secured by a spring urging the bolts into contact with the inclined surfaces associated with their corresponding apertures.

15 Claims, 10 Drawing Figures

SYSTEM FOR MOUNTING ACCESSORIES ON A CAMERA

The present invention relates to a system for mounting accessories on a camera, and particularly for mounting an electronic flash unit or a flashbulb unit.

In known mounting systems of the type described, a turnkey bolt is pivotally supported on the accessory and is turned by spring action. The bolt cooperates with a rack such that when a push button outwardly protruding from the accessory is depressed, the turnkey bolt meshes with the rack and firmly pulls the accessory and the camera housing together. This system is comparatively expensive due to the use of numerous, precisely fitted parts that are costly to manufacture. Further, due to the plurality of moving parts, there is an increased likelihood of unreliability over a long period of usage as compared with a simplified mounting system.

There is thus a need in the art for a system for mounting accessories on a camera that relies on only a few simple parts that can be readily manufactured and that give rise to trouble-free usage.

It is therefore an object of the present invention to provide a system for mounting accessories on a camera that is simple and comparatively inexpensive to manufacture;

it is another object of the invention to provide such a system that employs a minimum of moving parts;

it is a further object of the present invention to provide a simplified system for mounting accessories on a camera that is reliable and substantially maintenance-free.

These and other objects are fulfilled by the system for mounting accessories on a camera according to the present invention, in which the camera housing is provided with openings at the ends of the plane of contact between the accessory unit and the camera housing, opposed recessed faces that are inclined with respect to the contact plane are provided under the openings, and the accessory unit carries at least one fixed hook-shaped bolt at one end of its housing and at least one movable hook-shaped bolt at the other end, each bolt having an inclined face that is complementary to and is in contact with the inclined surfaces in the camera housing when the accessory is mounted on the camera housing. The movable hook-shaped bolt is spring loaded and the accessory unit is securely locked to the camera housing by the spring force urging the bolts against the inclined surfaces, thus providing a wedge-like action.

In a preferred embodiment of the invention, the movable bolt is pivotally mounted and swivels about an axis parallel to the plane of contact between the accessory and the camera housing. In another embodiment of the invention, the movable bolt is carried by a slide that is mounted for reciprocal sliding movement parallel to the contact plane. When a pivotally mounted bolt is employed, the swivel axis of the bolt is preferably parallel to the short side of a rectangular contact plane. When a sliding bolt is employed, the direction of sliding movement is preferably parallel to the long side of a rectangular contact plane.

Through the use of the mounting system of the present invention, the camera housing is free from protruding parts, such as slip-on shoes or the like. Furthermore, the contact area of the contact plane between the accessory and the camera housing is far greater than in the case of the conventional slip-on shoes and thus a more stable and secure locking of the accessory to the camera housing is obtained. The mounting system of the present invention is also adaptable to a camera housing having a curved surface, in which case the mounting surface of the accessory will be curved in a complementary manner.

The mounting system of the present invention not only provides a secure and safe locking of the accessory unit to the camera housing, but either the movable bolt or the fixed bolt can be used as an operating memeber for closing an electrical contact. For example, the fixed or movable bolt, or the slide carrying the movable bolt, can be used as a test key for an electronic flash. Thus, when the movable bolt is moved to its released position, the circuit of the flash unit is closed to discharge the flash condenser. This can be done when the flash unit is physically separated from the camera and, in addition, the discharging will occur automatically when the flash unit is removed from the camera. In this way, the bare contacts of the electronic flash can never be under a voltage charge and the user is free from the danger of electric shock occurring from accidentally touching the protruding high voltage-carrying contacts of the flash unit.

In another example, the fixed bolt can operate to contact a movable member within the camera housing, such as a pivotal lever, the movable member then acting to close an electrical connection. Alternatively, the fixed bolt itself can have mounted thereon a pivotal lever that is moved by the camera housing when the accessory is mounted on the camera housing, the movement of this lever acting to close an electrical contact within the accessory. By this means, an electronic flash can be provided in which the charging circuit is closed by the lever mounted on the fixed bolt only when the flash unit is mounted on the camera housing, and hence the flash can only be charged when it is mounted on the camera. If the electrical contact is arranged in the connection to the synchronizing contact, then substantially no voltage will be present at the two bare contacts of the flash unit when it is removed from the camera.

In another embodiment of the invention, either the fixed or the movable bolt carries an electrical contact that abuts a mating electrical contact mounted on the camera housing so that mounting the accessory on the camera automatically closes a desired circuit.

The present invention is illustrated in terms of the preferred embodiments in the accompanying drawings, in which.

Figure 1:
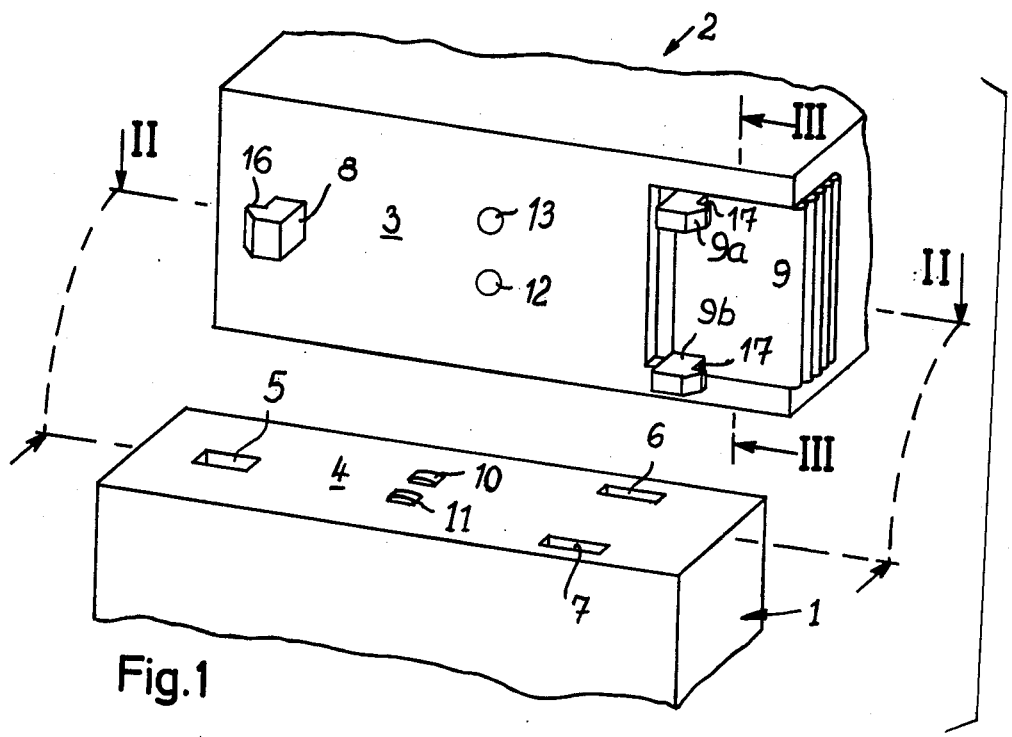
FIG. 1 is a perspective view of the upper part of a camera housing and the underside of a flash unit incorporating the mounting system of the present invention.
Figure 2:
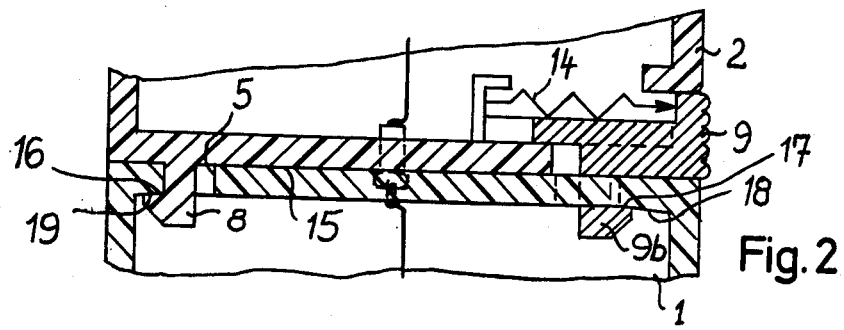
FIG. 2 is a view in section taken along the line II—II in FIG. 1 after mounting of the flash unit on the camera.

With reference to FIG. 1, a camera housing 1 has on its upper surface 4 apertures 5, 6 and 7 and electrical contacts 10 and 11. An accessory unit 2, shown in FIGS. 1–3 as a flash unit, has on its underside 3 a fixed bolt 8, a slide 9 and electrical contacts 12 and 13. Slide 9 is biased to the right, as seen in FIG. 2, by compression spring 14. Fixed bolt 8 latches with its inclined face 16 firmly contacting the inclined face 19 alongside opening 5 of the camera housing 1.

The slide 9 carries hooks 9a and 9b, both of which being shaped for insertion in apertures 6 and 7. Hooks 9a and 9b latch with their inclined faces 17 firmly contacting the inclined faces 18 alongside apertures 6 and 7.

The inclined faces 16 and 17 are at an acute angle with and diverge away from the plane of contact 15 between the accessory unit 2 and the camera housing 1, as are the corresponding inclined faces 18 and 19. When the accessory unit 2 is mounted on the camera housing 1, compression spring 14 serves to urge slide 9 and its hooks 9a and 9b away from fixed bolt 8 to force bolt 8 and hooks 9a and 9b to ride along the inclined faces 19 and 18, respectively, thus moving accessory unit 2 against camera housing 1. This action of the bolt 8 and slide 9 acts to firmly lock the accessory unit 2 to the camera housing 1.

The underside 3 of the accessory 2 is in contact with the upper surface 4 of the camera housing throughout substantially the entire extent of the underside 3, and hence the plane of contact 15 is very large, thus assuring a safe and reliable mounting of the accessory to the camera housing 1.

Figure 3:
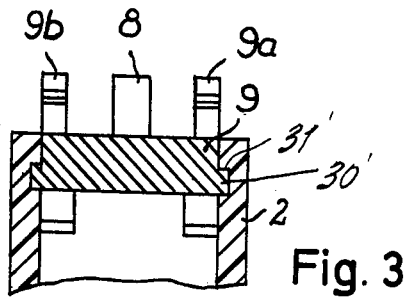
FIG. 3 is a view in section taken along the line III-—III in FIG. 1.

The reciprocal sliding movement of the slide 9 is guided by lateral ribs 30' that slide in corresponding grooves 31' in housing 2 (FIG. 3).

Figure 4:
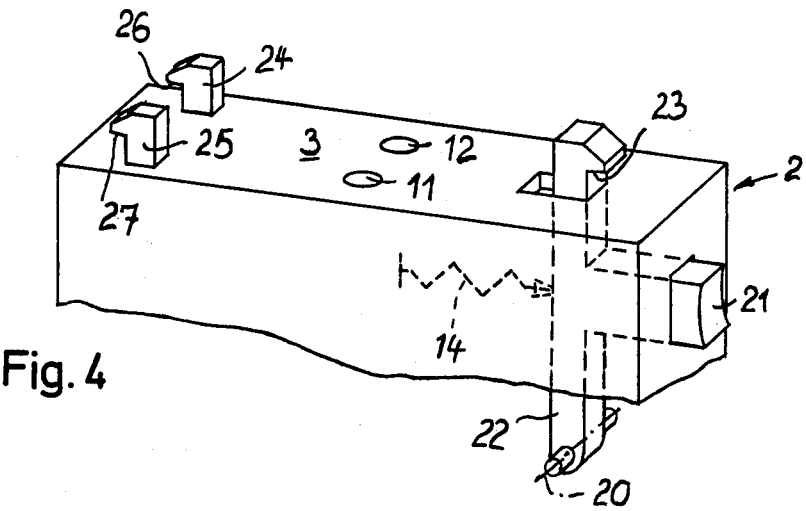
FIG. 4 is a perspective view of the underside of an accessory unit incorporating another embodiment of the invention.

FIG. 4 shows another embodiment of the invention in which the accessory unit 2 has a movable hook 22 pivotally mounted on pivot shaft 20. Push button 21 serves to unlock hook 22 by manual depression of the push button 21 against the force of compression spring 14. Opposite hook 22 are a pair of fixed bolts 24 and 25 having inclined faces 26 and 27, respectively. Movable hook 22 has an inclined face 23. The accessory unit shown in FIG. 2 is inserted into the camera housing shown in FIG. 1 by placing the fixed bolts 24 and 25 in apertures 6 and 7 and the movable hook 23 in aperture 5, the inclined faces 23, 26 and 27 cooperating with the inclined faces 18 and 19 in the manner described above to lock the accessory unit to the camera housing.

Figure 5:
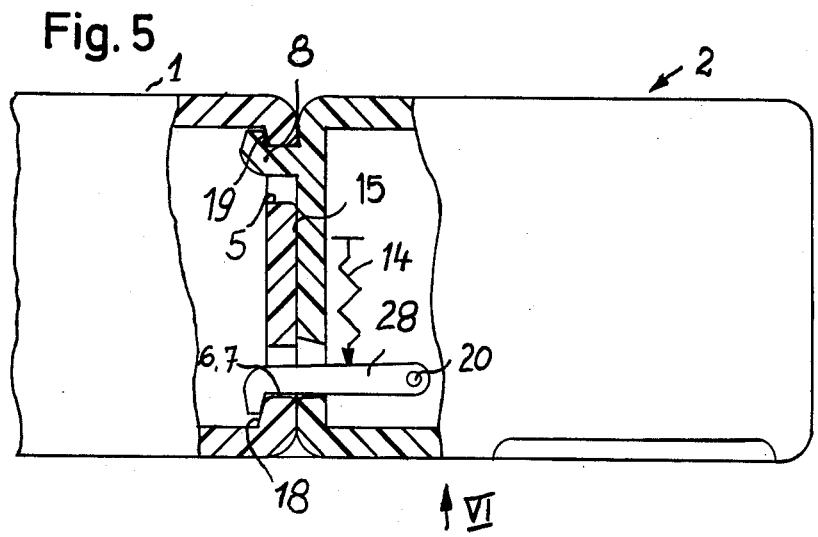
FIG. 5 is a side view, partly in section, of another embodiment of the invention.
Figure 6:
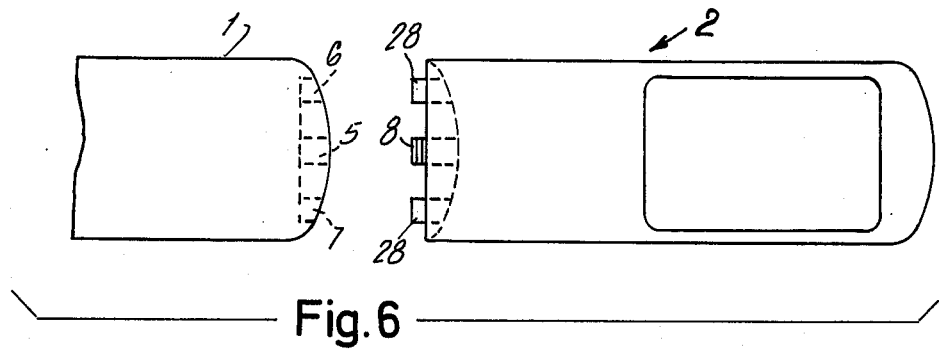
FIG. 6 is a view of a portion of the camera and the accessory unit taken in the direction of arrow VI in FIG. 5.

FIGS. 5 and 6 illustrate another embodiment of the invention in which the accessory unit 2 has a pair of movable hooks 28, each of which being mounted on pivot shaft 20 that is operated entirely internally. To unlock the accessory unit 2 from the camera housing 1, the accessory unit is moved downwardly with respect to FIG. 5 to pivot the hooks 28 about the pivot shafts 20 against the action of spring 14 until the fixed bolt 8 can be pulled through aperture 5 in camera housing 1.

Thereafter, the movable hooks 28 are readily removed from apertures 6 and 7. Mounting of the accessory unit 2 of FIGS. 5 and 6 is performed in the reverse sequence by first placing the movable hooks 28 into apertures 6 and 7 and then sliding accessory unit 2 downwardly to allow room for bolt 8 to enter aperture 5. As seen from FIGS. 5 and 6, the use of the embodiment shown therein provides a seamless construction for the upper surface 4 of camera housing 1 without any protruding parts previously necessary, such as slip-on shoes and the like.

Figure 7:
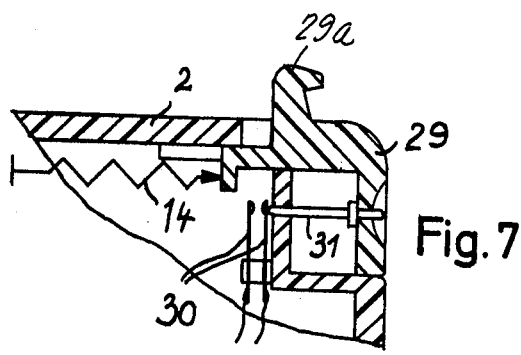
FIG. 7 is a detailed view in section of another embodiment of the invention in which the movable bolt can operate an electrical contact.

FIG. 7 shows another embodiment of the invention in which hook 29a is carried by slide 29. Slide 29 supports a contact pin 31 arranged to close a switch consisting of contact blades 30 when the slide 29 is moved to the left, as seen in FIG. 7. Slide 29 can thus be used as a test key for an electronic flash unit when the unit is detached from the camera housing 1. Furthermore, the electronic flash will flash automatically each time the flash unit 2 is removed from the camera housing 1, since removal necessarily requires sliding of the slide 29. This protects the user from electric shock arising from accidentally contacting the protruding contacts of the flash unit, which are usually charged with high voltage.

Figure 8:
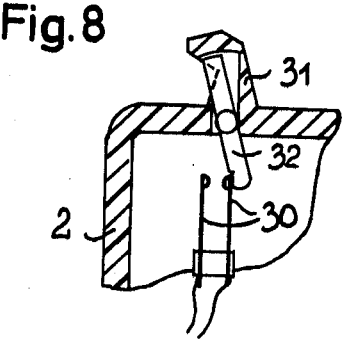
FIG. 8 is a detailed view in section of another embodiment of the invention in which the fixed bolt carries a pivotal lever for closing an electrical contact.

FIG. 8 shows another embodiment of the invention in which the fixed bolt 31 carries a pivotal lever 32. When the fixed bolt 31 is inserted into its respective aperture on the camera housing, lever 32 is pivoted in a clockwise direction, as shown in FIG. 8, to close contacts 30 of an electrical switch. If the switch is in the recharging circuit, recharging of the flash unit is possible only when the flash is inserted into the camera, since only then is the switch 30 closed. Switch 30 may be arranged in the connecting lane through the synchronizing contact, and thus substantially no voltage can exist at the protruding contacts of the flash when it is removed from the camera housing. It is clear that the embodiments shown in FIGS. 7 and 8 can be combined to advantage.

Figure 9:
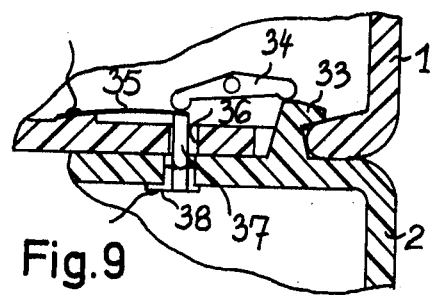
FIG. 9 is a detailed view in section of another embodiment of the invention in which the fixed bolt acts upon a pivotal lever mounted in the camera housing for closing an electrical contact.

FIG. 9 shows an accessory unit 2 having an electrical contact 38 recessed within the accessory unit 2 so that it cannot be accidentally touched by the tip of the finger. An electrical contact pin 37 is mounted on an electrical contact spring 35 that is secured to the camera housing 1. When the accessory unit 2 is inserted into the camera housing 1, the fixed bolt 33 contacts lever 34 and operates to rotate the lever 34 in a counter-clockwise direction, as viewed in FIG. 9, thereby moving contact pin 37 through aperture 36 into contact with contact piece 38 against the action of spring 35.

Figure 10:
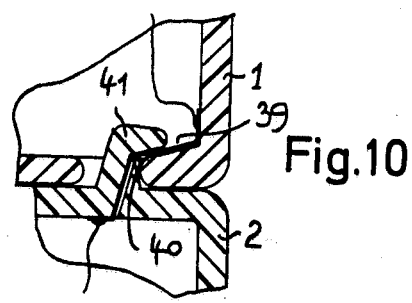
FIG. 10 is a detailed view in section of another embodiment of the invention in which electrical contacts are provided on the inclined faces of the fixed bolt and the camera housing.

FIG. 10 shows another embodiment of the invention in which electrical contact plates 39 and 40 are provided on the inclined surfaces of the camera housing 1 and the fixed bolt 41, respectively, such that an electrical connection is made between contact plates 39 and 40 when the accessory unit 2 is locked on the camera housing 1.

The embodiments of the invention shown in FIGS. 1–10 employ a pair of inclined surfaces that lead from each aperture and diverge with respect to one another away from the contact plane 15. The same effect can be obtained if one or both of the inclined surfaces 16 and 17 are reversed, i.e. are set at the mirror images shown in FIG. 2. If the surfaces 16 and 17 are both reversed so that they converge with respect to one another away from the point of contact plane 15, then the action of spring 14 would have to act in the opposite direction to that shown in FIG. 2.

What is claimed is:

1. A system for mounting an accessory unit on a camera housing, which comprises:
   (a) a camera housing having apertures therethrough disposed adjacent the ends of the plane of contact between the accessory unit and the camera housing, and an inner surface provided with opposed inclined surfaces leading from each aperture, and
   (b) an accessory unit comprising at least one stationary hook-shaped bolt means and at least one movable hook-shaped bolt means disposed to fit into said apertures, said bolt means having inclined faces corresponding to the inclined faces in the camera housing inner surface such that when the accessory unit is mounted on the camera housing with the bolt means in the apertures, the inclined faces of the bolt means are in contact with the inclined faces of the camera housing inner surface, and spring means urging said bolt means into contact with said inclined surfaces.

2. The system according to claim 1, in which said opposed inclined surfaces lead from each aperture and diverge away from said contact plane, said spring means urging said bolt means apart.

3. The system according to claim 1, wherein said accessory unit has a guideway parallel to said contact plane and said movable bolt means if mounted for reciprocal sliding movement in said guideway.

4. The system according to claim 3, wherein said plane of contact is rectangular and said guideway is parallel to the longer side of the rectangle.

5. The system according to claim 1, wherein said movable bolt means is a hook-shaped pivotal lever mounted for pivotal movement about a pivot shaft parallel to said plane of contact.

6. The system according to claim 5, wherein said plane of contact is rectangular and said pivot shaft is parallel to the shorter side of the rectangle.

7. The system according to claim 1, wherein there are two fixed hook-shaped bolt means in side-by-side relationship and corresponding apertures in said camera housing.

8. The system according to claim 1, wherein there are two movable hook-shaped bolt means in side-by-side relationship and corresponding apertures in said camera housing.

9. The system according to claim 1, wherein at least one of said bolt means carries means for closing an electrical circuit, said circuit closing means being actuated when the accessory unit is mounted on the camera housing and deactuated when the necessary unit is removed from the housing.

10. The system according to claim 9, wherein said circuit is in the accessory unit and the circuit closing means is a rod means carried by said movable bolt means, said rod means being adapted to close an electrical contact when the movable bolt means is moved against the bias of the spring means.

11. The system according to claim 9, wherein said circuit closing means is an electrical contact plate on said bolt means, and the corresponding aperture has a mating electrical contact plate on its associated inclined face.

12. The system according to claim 9, wherein said circuit is in the accessory unit and the circuit closing means is a movable member mounted on said fixed bolt means, said movable member being adapted to move and thus close an electrical contact when said fixed bolt means is inserted in its corresponding aperture.

13. The system according to claim 12, wherein said movable member is a pivotal lever.

14. The system according to claim 1, wherein said camera housing has a movable member therein disposed to close an electrical contact when actuated, said movable member being adjacent an aperture and being moved to its actuating position by insertion of a bolt means in said aperture.

15. The system according to claim 14, wherein said movable member is a pivotal lever.

* * * * *